(12) United States Patent
Ma et al.

(10) Patent No.: US 7,698,294 B2
(45) Date of Patent: Apr. 13, 2010

(54) CONTENT OBJECT INDEXING USING DOMAIN KNOWLEDGE

(75) Inventors: Wei-Ying Ma, Beijing (CN); Lie Lu, Beijing (CN); Ji-Rong Wen, Beijing (CN); Zhiwei Li, Beijing (CN); Zaiqing Nie, Beijing (CN); Hsiao-Wuen Hon, Beijing (CN)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/275,509

(22) Filed: Jan. 11, 2006

(65) Prior Publication Data
US 2007/0162408 A1    Jul. 12, 2007

(51) Int. Cl.
*G06F 17/30* (2006.01)
(52) U.S. Cl. ............... 707/102; 707/6; 707/3; 707/5; 707/101; 706/48
(58) Field of Classification Search .......... 707/100
See application file for complete search history.

(56) References Cited

U.S. PATENT DOCUMENTS

| | | | | |
|---|---|---|---|---|
| 6,112,203 | A * | 8/2000 | Bharat et al. | 707/5 |
| 6,138,113 | A * | 10/2000 | Dean et al. | 707/2 |
| 6,173,275 | B1 * | 1/2001 | Caid et al. | 706/14 |
| 6,185,550 | B1 * | 2/2001 | Snow et al. | 707/1 |
| 6,970,881 | B1 * | 11/2005 | Mohan et al. | 707/102 |
| 7,251,637 | B1 * | 7/2007 | Caid et al. | 706/15 |

OTHER PUBLICATIONS

Muyuan Wang et al., "Web Object Indexing Using Domain Knowledge", Proceeding of the eleventh ACM SIGKDD international conference on Knowledge discovery in data mining, 2005, USA.
K. Bharat et al, "Improved Algorithms for Topic Distillation in a Hyperlinked Environment", in Proceedings of the SIGIR conference on Information Retrieval, 1998, pp. 104-111.
J. Kleinberg, "Authoritative sources in a hyperlinked environment", Journal of the ACM, vol. 46, Issue 5, pp. 604-632, 1999.
H. Chang et al., "Learning to create customized authority lists", In Proceedings of the Seventeenth International Conference on Machine Learning, 2000.
V. Harmandas, "Image Retrieval by Hypertext Links", In Proceedings of the SIGIR conference on Information Retrieval (SIGIR '97), 1997.

(Continued)

*Primary Examiner*—Cam Y T Truong (57) ABSTRACT

A content object indexing process including creating a content object knowledge index, calculating a description vector of a target content object, and indexing the target content object by searching for the description vector in the content object knowledge database. It may be difficult to search for an exact content object such as a music file or academic researcher as a conventional search index may not include related hierarchical information. A content object indexing process may add hierarchical information taken from a content object knowledge index and incorporate the hierarchical information to the index entry for a specific content object. An application of such a content object indexing process may be a world wide web search engine.

10 Claims, 7 Drawing Sheets

OTHER PUBLICATIONS

K. Sugiyama et al., "Refinement of TF-IDF Schemes for Web Pages using their Hyperlinked Neighboring Pages", In Proceedings of the fourteenth conference on Hypertext and Hypermedia, 2003.

B. Y. Ricardo et al., "The Continued Saga of DB-IR integration", The 30th International Conference on Very Large Databases (VLDB) Tutorial, 2004.

V. Hristidis et al., "Discover: Keyword Search in Relational Databases", In Proceedings of the 28th International Conference on Very Large Databases (VLDB), 2002.

S. Cohen et al., "XSEarch: A Semantic Search Engine for XML", In Proceedings of the 29th International Conference on Very Large Databases (VLDB), 2003.

Zaiqing Nie et al. "Object-Level Ranking: Bringing Order to Web Objects", Proceedings of the 14th international conference on World Wide Web, 2005, pp. 567-574.

* cited by examiner

CONTENT OBJECT INDEXING USING DOMAIN KNOWLEDGE

BACKGROUND

Content objects stored on a computer network, such as the Internet, may be indexed by a search engine and indirectly referenced by a web page that includes a link to the content object. Such a link typically provides the location of the content object.

SUMMARY

Content object indexing using domain knowledge may add information about a corresponding implicit structure, among other information, to the indexing of content objects.

DESCRIPTION OF THE DRAWINGS

The present invention will be described in accordance with the following figures.

DETAILED DESCRIPTION

The detailed description provided below in connection with the appended drawings is intended as a description of the present examples and is not intended to represent the only forms in which the present examples may be constructed or utilized. The description applies to one or more functions of the examples and one or more sequences of steps for constructing and operating the examples. However, the same or equivalent functions and sequences may be accomplished by different examples.

Content object indexing services are described herein. More particularly, the description herein pertains to services, methods, programs, and other techniques for indexing content objects which may be stored on, or associated with, a computer network.

A user of the internet may wish to search for a specific piece of digital content, for example, a digital music file, a digital video file, or a text file. Such a user may use a world wide web search engine, for example, MSN® Search or Google, to search for the specific piece of digital content. Typically, the user may enter one or more search terms, for example the title of a song or the topic of a research paper, into a search term entry field of the search engine to perform the search. The typical result of such a query may be a list of links or uniform resource locators (URLs) of containers, for example world wide web pages containing HTML, which reference the specific piece of digital content.

The user may then evaluate the list of links and select the link that the user may determine to best match the specific piece of digital content. Once the user has navigated to the container specified in the link, the user may be required to further search the container for a link to the specific piece of digital content. The user may determine the container includes a link to a similarly named piece of digital content that may not be the specific piece of digital content for which the user is searching. For example, the user may find a version of a song, which is the subject of a search, performed by a musical artist other than the desired one.

A method of indexing content objects that includes the implicit structure of the information regarding the content object may be useful in searching for content objects on a network.

Figure 1:
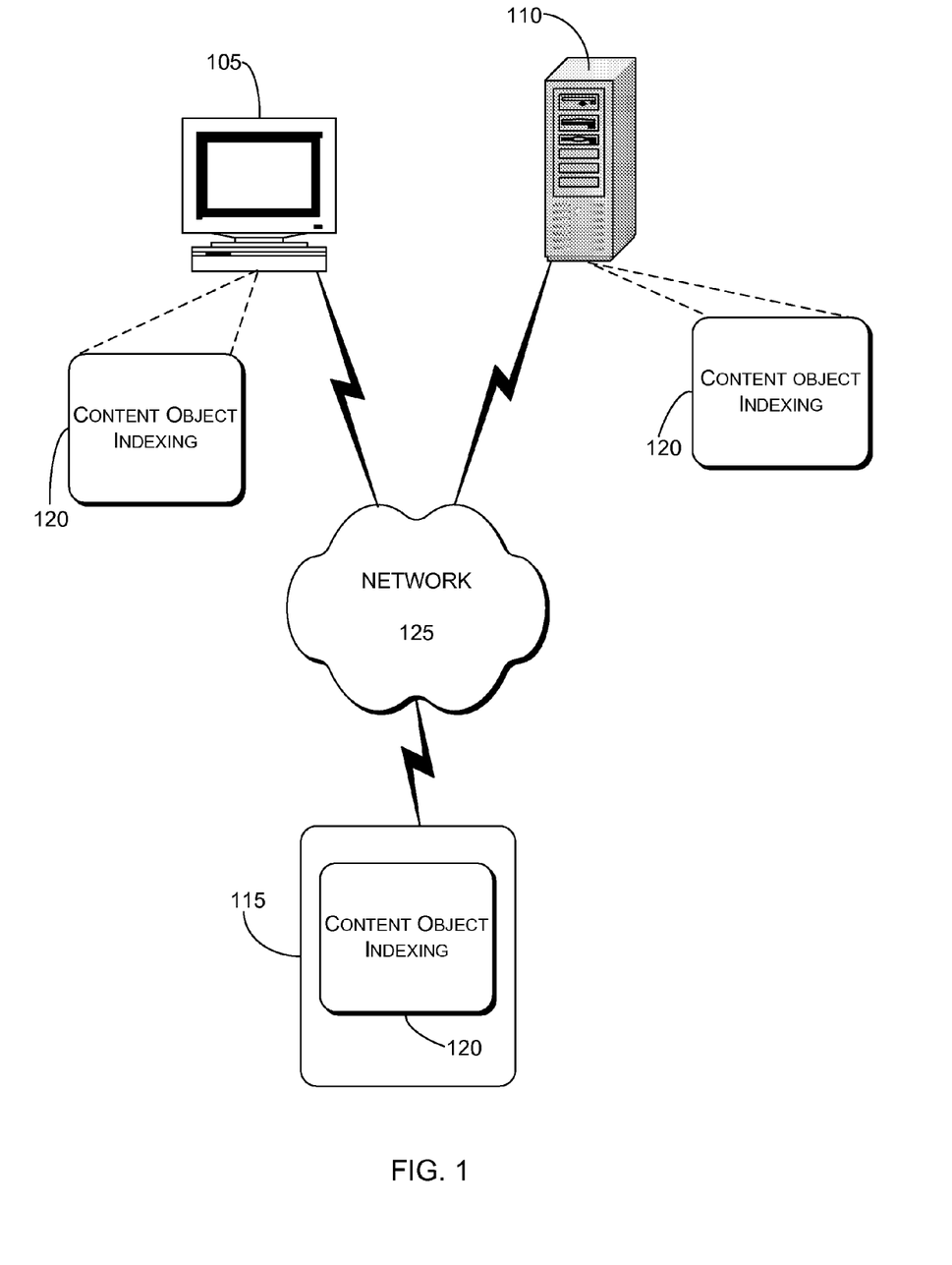
FIG. 1 shows devices communicating over a network, with the devices implementing example technologies for content object indexing.

FIG. 1 shows example network environment 125 in which examples of content object indexing services may be implemented, although the examples of content object indexing services are not necessarily limited to network environments. Regardless, in FIG. 1, the client device 105, server device 110, and "other" device 115 may be communicatively coupled to one another via a network 125; and, further, at least one of the client device 105, server device 110, and "other" device 115 may be capable of implementing content object indexing services 120, as described herein.

The client device 105 may be at least one of a variety of conventional computing devices, including a desktop personal computer (PC), workstation, mainframe computer, Internet appliance, set-top box, and gaming console. Further, the client device 105 may be at least one of any device that is capable of being associated with the network 125 by a wired and/or wireless link, including a personal digital assistant (PDA), laptop computer, cellular telephone, etc. Further still, the client device 105 may represent the client devices described above in various quantities and/or combinations thereof. The "other" device 115 may also be embodied by any of the above examples of the client device 105.

The server device 110 may provide any of a variety of data and/or functionality to the client device 105 or the "other" device 115 in accordance with at least one implementation of content object indexing 120. The data may be publicly available or alternatively restricted, e.g., restricted to only certain users or only if an appropriate subscription or licensing fee is paid. The server device 110 may be at least one of a network server, an application server, a blade server, or any combination thereof. Typically, the server device 110 is any device that may be a content source, and the client device 105 is any device that may receive such content either via the network 125 or in an off-line manner. However, according to the example implementations described herein, the client device 105 and the server device 110 may interchangeably be a sending node or a receiving node in the network environment 100. The "other" device 115 may also be embodied by any of the above examples of the server device 110.

The "other" device 115 may be any further device that is capable of implementing content object indexing services 120 according to one or more of the examples described herein. That is, the "other" device 115 may be any software-enabled computing or processing device that is capable of implementing content object indexing services for an application, program, function, or other assemblage of programmable and executable code. Thus, "other" device 115 may be a computing or processing device having at least one of an operating system, an interpreter, converter, compiler, or runtime execution environment implemented thereon. These examples are not intended to be limiting in any way, and therefore should not be construed in such manner.

The network 125 may represent any of a variety of conventional network topologies and types, which may include wired and/or wireless networks. The network 125 may further utilize any of a variety of conventional network protocols, including public and/or proprietary protocols. The network 125 may include, for example, the Internet as well at least portions of one or more local area networks (also referred to, individually, as a "LAN"), such as an 802.11 system; a personal area network (ie., PAN), such as Bluetooth.

Computer architecture in at least one of devices 105, 110, and 115 has typically defined computing platforms in terms of hardware and software. Software for computing devices came to be categorized into groups, based on function, which may include: a hardware abstraction layer (alternatively referred to as a "HAL"), an operating system (alternatively referred to as "OS"), and applications.

The operating system may serve as at least an application execution platform and may implement such code reuse techniques as a component object model (COM). The operating system may execute applications either on demand in response to interaction from a user of the operating system or automatically based on at least a startup parameter of the operating system. For example, the operating system may implement a persistent store of application preferences and settings which may be a registry. The persistent store, or registry, may be queried by the operating system to determine which applications should be automatically executed upon startup.

Figure 2:
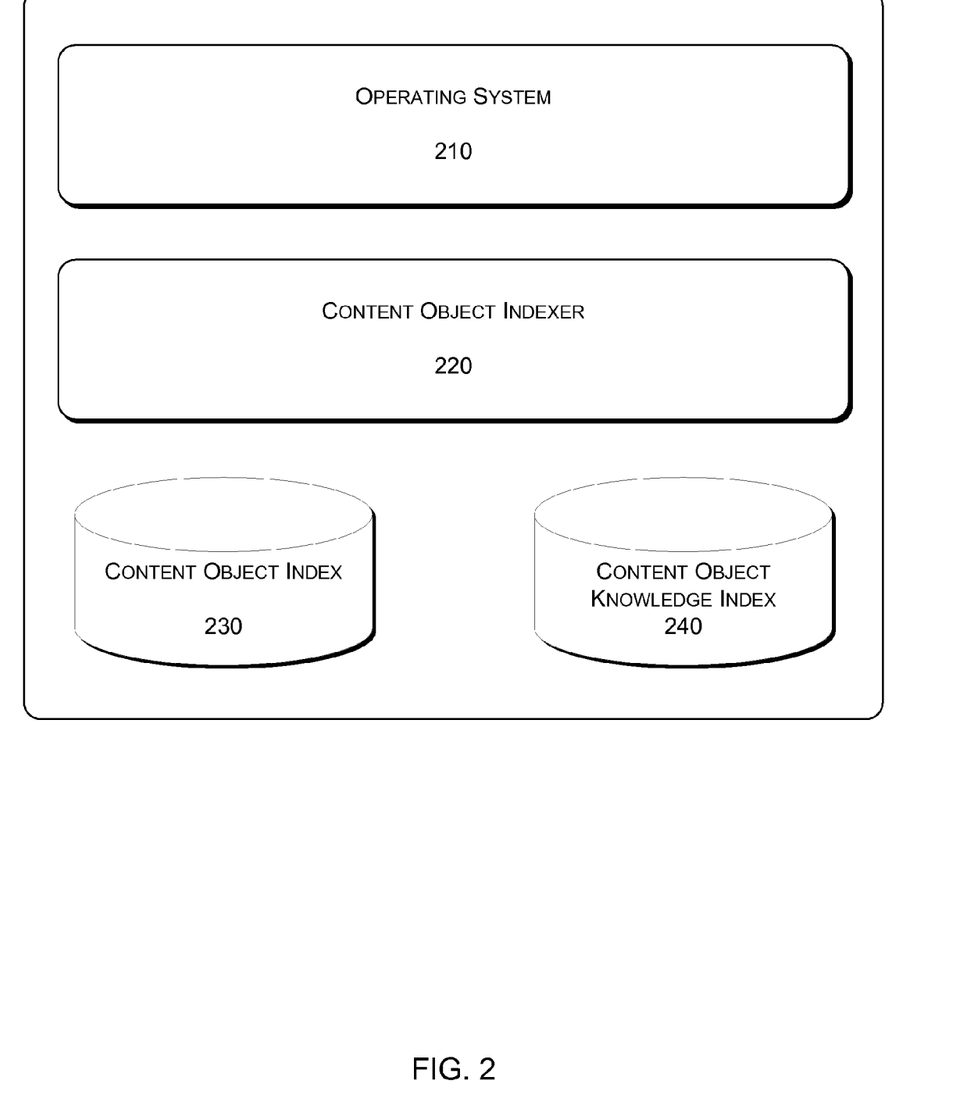
FIG. 2 shows an example of an execution environment for implementing example technologies for content object indexing.

FIG. 2 shows an example execution environment 200 in which examples of content object indexing services 120 (see FIG. 1) may be implemented.

Figure 4:
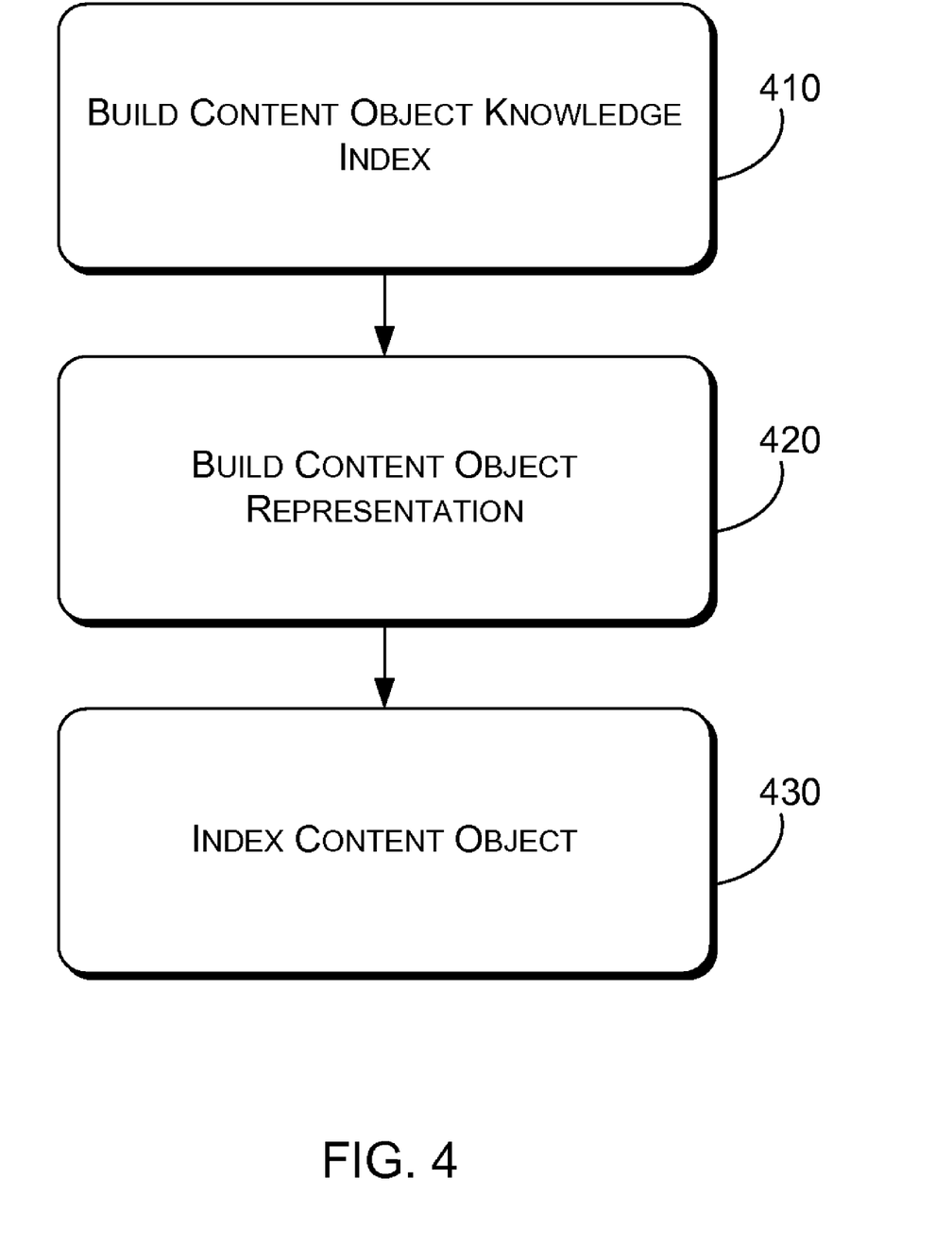
FIG. 4 shows an example processing flow in accordance with an example implementation of content object indexing.
Figure 5:
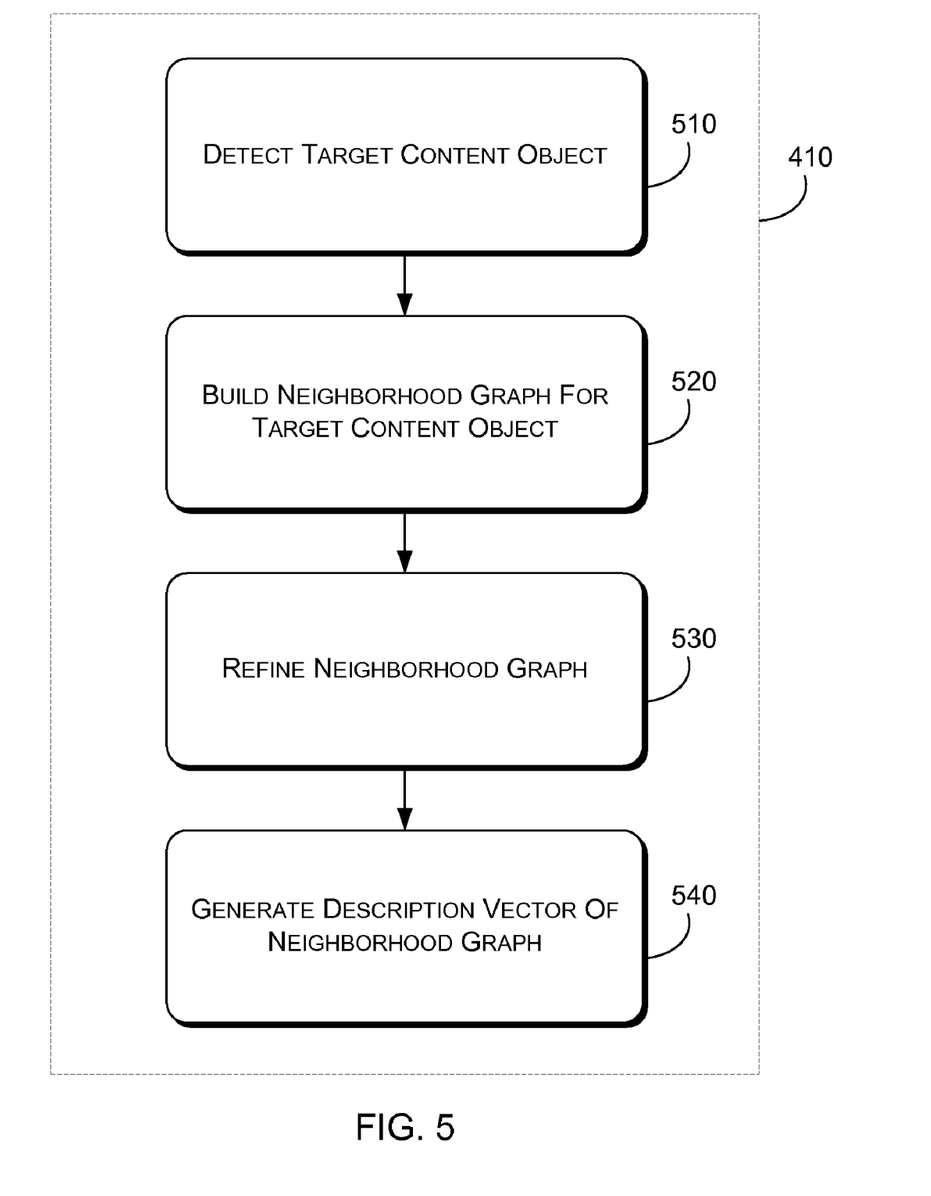
FIG. 5 shows an example operation performed as part of the processing flow of FIG. 4.
Figure 6:
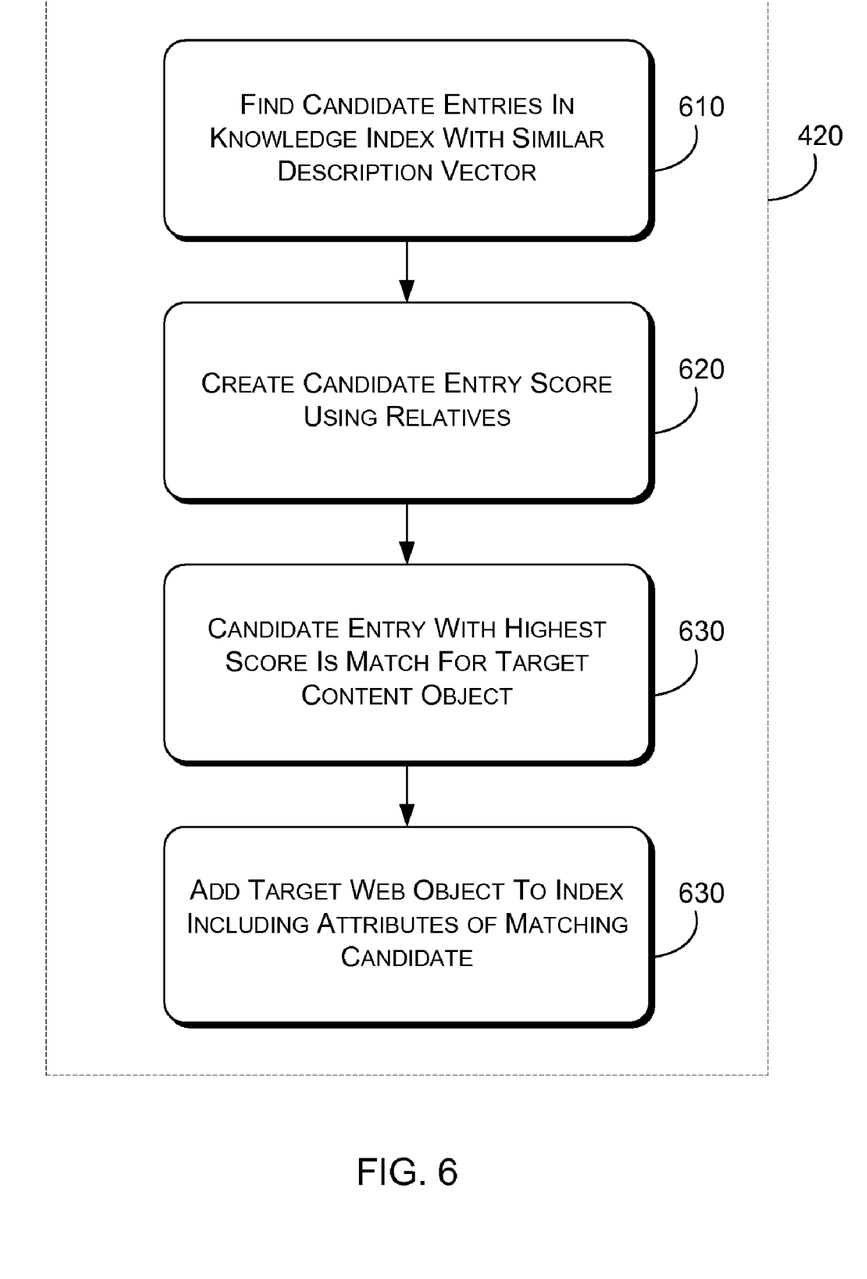
FIG. 6 shows an example operation performed as part of the processing flow of FIG. 4.

In the description of the modules of FIG. 2, which may also be referred to by the descriptions of FIGS. 4, 5 and 6, various operations may be described as being performed by different modules of the execution environment 200. The operations that are described with respect to a particular module may be carried out by the particular module itself, by the particular module in cooperation with the example operating system 210, or by the particular module in cooperation with another of the modules of the execution environment 200. Thus, the descriptions relate to example implementations, and are not intended to be limiting in any manner.

The execution environment 200 may execute the example operating system 210. The example operating system 210 may implement the following: input/output (hereafter "I/O") routine management, network communication services, memory management, service routine execution, or application execution. Thus, the execution environment 200 may include, at least, a content object indexer 220, a content object index 230, and a content knowledge index 240 in conjunction with the example operating system 210. These modules are to be described in further detail below, and are provided only as examples, and may be implemented in examples of execution environment 200 in various combinations and configurations thereof. The examples are not intended to be limiting to any particular implementation of a particular execution environment, and no such inference should be made.

The content object indexer 220 may be a software component which may execute in conjunction with the example operating system 210. The content object indexer 220 may make use of the I/O or network communication services of the example operating system 210 to store or retrieve information that may be stored within the content object index 230 and/or the content object knowledge index 240. The content object indexer 220 may provide functionality to create a content knowledge index which may be stored in the content object knowledge index 240. The content object indexer 220 may also provide functionality to create an index entry within the content object index 230 for a specific content object and/or content object container using information retrieved from the content object knowledge index 240.

The content object index 230 may be a database application, a database service, or data storage of any type executing in conjunction with the operating system 210. The content object index 230 may store data corresponding to specific content objects and/or content object containers. For example, the content object index 230 may store an identifier of a content object, the location of content object, attributes describing the content object, or any other information related to the content object. The content object index 230 may also implement typical data access functionality such that other processes, services, applications, components, or any other system coupled to the content object index 230 may request that the content object index 230 add, modify, or delete information.

The content object knowledge index 240 may be a database application, a database service, or data storage executing in conjunction with the operating system 210. The content object knowledge index 240 may store a hierarchy of data corresponding to a category of content objects and/or containers of content objects. For example, the content object index 230 may store an address of a content object container and/or the content object itself, an identifier of a content object, whole or truncated text terms corresponding to the content object, attributes describing the content object, or other information related to a content object. The content object knowledge index 240 may also implement typical data access functionality such that other processes, services, applications, components, or another system coupled to the content object knowledge index 240 may request the content object knowledge index 240 add, modify, or delete information.

The content object knowledge index 240 may further store information corresponding to multiple categories of content objects and/or content object containers, and may further store multiple layers of content object knowledge information. For example, the information stored in a first layer of the content object knowledge index 240 may represent a musical artist, the information stored in a second layer may represent an album recorded by the musical artist, and the information stored in a third layer may represent a musical track on the album referenced in the second layer.

In an alternative example, the information stored in a first layer of the content object knowledge index 240 may represent a researcher, the information stored in a second layer may represent a research paper authored by a researcher, and the third layer may represent a conference where a research paper was presented by a researcher.

Further, an index for a content object and/or a content object container stored within the content object knowledge index 240 may also store data corresponding to references corresponding to the content object and/or content object container. Such references may be hyperlinks between world wide web pages, may be keys in a database records, or any other type of reference to any other type of content object and/or content object container.

Figure 3:
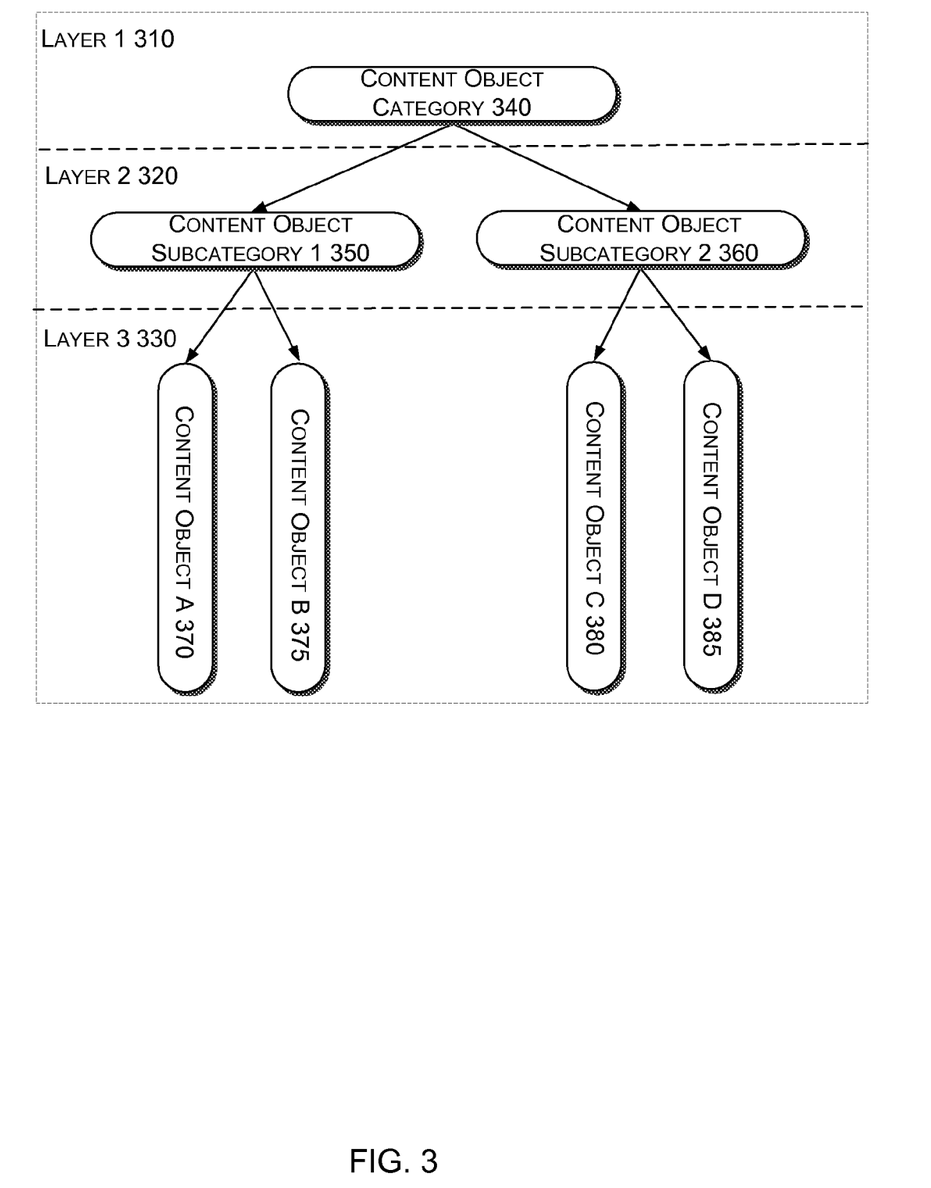
FIG. 3 shows an example data structure which may be indexed in accordance with an example implementation of content object indexing.

FIG. 3 shows an example layer structure 300 in accordance with at least one example implementation of content object indexing 120 (see FIG. 1). The example layer structure 300 may be described with reference to the features of the execution environment 200 (see FIG. 2), although such implementations are illustrative of examples only, and are not intended to be limiting in any manner.

According to examples of content object indexing 120, a content object and/or content object container to be indexed may typically fall into a hierarchical structure as shown in the example layer structure 300. For example, music content objects and/or content object containers may be organized into songs, albums, or artists. In another example, academic research content objects and/or content object containers may be organized into authors, papers, conferences, or journals.

Layer 1 310 may include a content object category 340, which may be an index entry. Alternatively, layer 1 310 may include multiple content object categories or multiple index entries. The example layer structure 300 is not limited to including indexes and index entries for one category of content objects and/or content object containers. Layer 1 310 may also include data and/or metadata that identifies the type of data stored within layer 1 310.

For example, the example layer structure 300 may represent music content objects and/or content object containers. That is, Layer 1 310 may include indexes including musical artist information in the content object category 340. More particularly, the content object category 340 may include a broad index entry for a musical artist or musical group.

In an alternative example, the example layer structure 300 may represent academic research content objects and/or content object containers. In this example, layer 1 310 may include an alternative broad index entry for a specific research author in the content object category 340.

Layer 2 320 may include a content object subcategory 1 350 and a content object subcategory 2 360. Such content object subcategories may represent index entries in a subsequent level in a hierarchical structure of a content object category. Layer 2 320 may also include data and/or metadata that identifies the type of data stored within layer 2 320.

For example, if the content object category 340 includes an index entry for a specific musical artist, content object subcategory 1 350 may include an index entry for a first album corresponding to the specific musical artist. Further, content object subcategory 2 360 may include an index entry for a second album by the specific musical artist.

In an alternative example, the content object category 340 may include an index entry for a specific research author. Content object subcategory 1 350 may include an index entry for a first research journal which may include research articles authored by the specific research author. Further, content object subcategory 2 360 may include an index entry for a second research journal which may include research articles authored by the specific research author.

Content object subcategory 1 350 and content object subcategory 2 360 may include one or more references to other index entries included in other layers. Such references may correspond to the hierarchical structure associated with the category of indexed content objects. Further, content object subcategory 1 350 and content object subcategory 2 360 may also include information related to one or more references or links included in an indexed content object or and/or content object container. Including such references may preserve at least a portion of the hierarchical information of the original content objects and/or content object containers of content object subcategory 1 350 and content object subcategory 2 360.

For example, content object category 340 may include information corresponding to a specific musical artist, content object subcategory 1 350, and content object subcategory 2 360 may include information about a first and second music album, respectively. Content object subcategory 1 350 and content object subcategory 2 360 may then include at least one reference to indexes and/or index entries in layer 1 310 that may include index entries for at least one specific musical artist. Further, indexes and/or index entries included in content object subcategory 1 350 and/or content object subcategory 2 360 may include references to index entries included in layer 3 330 which may include index entries for songs.

In another example, content object category 340 may include information about a specific research author and content object subcategory 1 350 and content object subcategory 2 360 may include information about a first and second research journal including articles authored by the specific research author, respectively. Content object subcategory 1 350 and content object subcategory 2 360 may then include at least one reference to indexes and/or index entries in layer 1 310, which may include index entries for at least one specific research author. Further, indexes and/or index entries included in content object subcategory 1 350 and/or content object subcategory 2 360 may include references to index entries included in layer 3 330, which may include index entries for research papers published in a research journal.

Layer 3 330 may include at least one index entry for content object A 370, content object B 375, content object C 380, and content object D 385. Such content object and/or content object container indexes or index entries may represent a subsequent level in a hierarchical structure of a content object category. Layer 3 330 may also include data and/or metadata that identifies the type of data stored in layer 3 330.

For example, content object category 340 may include an index entry for a specific musical artist, content object subcategory 1 350 may include an index entry for a first musical album corresponding to the specific musical artist, and content object subcategory 2 360 may include an index entry for a second musical album corresponding to the specific musical artist. Further, content object A 370 may refer to a first song which may appear on the first musical album and content object B 375 may refer to a second song which may appear on the first musical album. Continuing the example, content object C 380 may refer to a first song which may appear on a second musical album, and content object D 385 may refer to a second song which may appear on a second musical album.

In an alternative example, content object category 340 may include information about a specific research author, content object subcategory 1 350 may include an index entry for first research journal, and content object subcategory 2 360 include an index entry for a second research journal. Further, content object A 370 may refer to a first research paper which may be published in the first research journal and content object B 375 may refer to a second research paper which may be published the first research journal. Continuing the example, content object C 380 may refer to a first research article which may be published in a second research journal, and content object D 385 may refer to a second research article which may be published in a second research journal.

Content object A 370, content object B 375, content object C 380, and content object D 385 may include one or more references to other indices included in other layers. Such references may correspond to the hierarchical structure associated with the category of indexed content objects and/or content object containers. Including such references corresponding to the content object and/or content object containers may preserve at least a portion of the hierarchical information of the original content object and/or content object containers of content object A 370, content object B 375, content object C 380, content object D 385.

Example layer structure 300 may be implemented by a content object indexing service 120 (see FIG. 1) for structuring the storage content object knowledge information. Further, content object knowledge information may be useful in creating informative content object index entries which may then be used by users searching for a specific content object.

FIG. 4 shows example processing flow 400 in accordance with an example implementation of content object indexing service 120 (see FIG. 1). Processing flow 400 may be described with reference to the features of the execution environment 200 (see FIG. 2) and the example layer structure 300 (see FIG. 3), although such implementations are illustrative of examples only, and are not intended to be limiting in any manner.

Block 410 may refer to an operation in which a content object knowledge index 240 (see FIG. 2) may be created. The structure of such a content object knowledge index 240 may resemble the example layer structure 300 (see FIG. 3). Content object knowledge index 240 may be built by applying latent semantic indexing (LSI) to a location storing information about the category of content objects to be indexed.

For example, a content object knowledge index may be created for music content objects and/or content object containers by applying LSI to a world wide web site which may include information about a significant volume musical songs. In an alternative example, a content object knowledge index may be created for academic research content objects and/or content object containers by applying LSI to an inventory database of an academic research publisher.

In applying LSI to the location storing content object containers, a database containing a text term and container co-occurrence matrix may be generated. For example, a process may be performed in which the text of each world wide web document may be read to produce a set of text terms, meaningless or unimportant text terms may be removed from the set of text terms, and each occurrence of a text term in the collection of content object containers may be counted.

In an alternative example, a content object may also have summary data, metadata, or any other type of data associated with it, either locally or remotely. A process may be performed in which the text extracted from the summary data, metadata, or another type of data associated with the content object may be read to produce a set of text terms, meaningless or unimportant text terms may be removed from the set of text terms, and each occurrence of a text term in the collection of content object containers may be counted.

In applying LSI to the set of text terms, a weight may be applied to each text term corresponding to the number of times the text term appears in one or more containers of content objects at the chosen location. For example, a term frequency/inverse document frequency (TFIDF) function may be used to calculate a weight for each text term as follows:

$$TFIDF(w) = f(w) \cdot \log \frac{N}{|D(w)|}$$

Where w may represent a text term, f(w) may represent the term frequency in all containers, N may represent the total number of text terms discovered, and D(w) may represent the set of containers which may contain the text term w.

For example, the term/container co-occurrence matrix may appear as follows:

|  | container A | container B |
|---|---|---|
| Techno | 3.4 | 17.82 |
| Wrestle | 0.0 | 9.22 |

Where the intersection of the container columns and term rows represents a weighted number of times the term may appear in the container. The intersection of the container columns and the term rows may also be represented by a vector. For example, container A may be assigned a value of 1 and the term "techno" may be assigned a value of 1. The vector representing the weighted number of times the term "techno" appears in the above example matrix may therefore be (1,1).

Using LSI, a single value decomposition (SVD) function may be applied to the matrix to add additional information to the term/container co-occurrence value. For example, single value decomposition may be applied to the above term/container co-occurrence matrix such that the term/container co-occurrence matrix appears as follows:

|  | container A | container B |
|---|---|---|
| techno | 0.003 | 0.021 |
| wrestle | −0.001 | 0.012 |

A "score" may be calculated using the above describe text term/container matrix. A score may be calculated for a particular term by summing the values corresponding to the term. For example, the score of "techno" in the example matrix above may be "0.003+0.021" which equals "0.024". Further, a score for a particular container may be calculated by summing the values corresponding to the container. For example, the score of "container A" in the example matrix above may be "0.003+−0.001" which equals "0.002".

As previously discussed, the structure of a content object knowledge index 240 may resemble the example layer structure 300. For example, the content knowledge index 240 may include a term/container co-occurrence matrix for each layer of the example layer structure 300. In addition, information regarding the source and destination of links included within the containers may also be stored in the content object knowledge index.

While the above process has been discussed with respect to creating the content object knowledge index 240, any equivalent process for creating a content object knowledge index 240 may be substituted without limitation. Once the content object knowledge index has been created, processing flow 400 may continue to block 420.

Block 420 may refer to an operation by which content object indexing 120 (see FIG. 1) begins to detect specific content objects and create index entries for the specific content objects. The operation may further include creating a content object representation for the specific content object. In particular, a particular content object may be contained in a world wide web page which includes a reference to the content object. However, the world wide web page which includes a reference to content object may not produce enough information to positively identify the content object.

For example, a world wide web page which includes a reference to a particular music file may not also include information about the artist or the album corresponding to the song. Such information may be contained in neighboring world wide pages that contain references to the world wide web page that further contains a reference to the particular music file. In an alternative example, a research publication publisher database record may contain information about a specific research paper; however, the database record may not contain a reference to the specific author of the specific research paper. Such information may be contained in related database records that may, in turn, contain references to the specific research paper.

Therefore, a content object representation that includes information corresponding to related content object containers may be built. The operation which may create a content object representation will be discussed with respect to FIG. 5. Once the content object representation has been created for the content object under examination, processing flow 400 may continue on to block 430.

Block 430 may refer to an operation in which the index entry for the specific content object under examination may be created and stored. The operation may include comparing the content object representation created at block 420 to the content object knowledge index created at block 410. Once a matching content object index entry has been located within the content object knowledge index, a specific index entry for the content object under investigation may be created and stored in the content object index 230. Such an index entry may include the text terms and hierarchy information of the index entry found to match in the content object knowledge database and a location of the content object under examination.

FIG. 5 shows further detail of block 410 as performed as part of the processing flow 400 (see FIG. 4) in accordance with an example implementation of a content object indexing service 120 (see FIG. 1). The processing flow of example operation 410 may be described with reference to the features of the execution environment 200 (see FIG. 2) and the example layer structure 300 (see FIG. 3), although such implementations are illustrative of examples only, and are not intended to be limiting in any manner.

Block 510 may refer to an operation in which a target content object may be selected either from a predetermined list or from a conventional search of the world wide web. For example, the location of the target content object may be known in advance, the location of the target content object may be discovered by entering the name of the content object into a typical world wide web search engine, or the target content object may be detected using a tool which recursively crawls world wide web pages. The location of the target content object may be given as the uniform resource locator (URL) of a world wide web page which includes a reference to the target content object. The world wide web page which includes a reference to the target content object may be called a "container" of the target content object. In an alternative example, an academic publishing database may be queried and a set of matching database records may be returned.

The container of the target content object may then have latent semantic indexing applied to discover the set of text terms related to the target content object. However, such a set of text terms may not be sufficient to fully identify the target content object. For example, if the target content object is a song, the container, or world wide web page that may include a hyperlink to the song, may not contain album or artist information. That is, the target content object song may either been performed by more than one musical artist or the name of the target content object song may be a common name used to name a song by more than musical artist.

Block 520 may refer to an operation in which a more comprehensive set of information corresponding to the target content object may be generated. Such a more comprehensive set of information may be generated through a recursive inspection of links included in the container of the target content object. Such a structure may be said to be intrinsically related to the hierarchical structure of the category.

For example, a world wide web page including a reference to a music file may itself be linked to by another world wide web page which includes information about a musical album where the music file may appear. A world wide page linking to the world wide web musical album page may be a world wide web page which includes information about the musical artist.

In an alternative example, within a database storing a database record including a reference to a published research paper may be other database records corresponding to research journals which include a reference to the published research paper. Further, the database records corresponding to research journals may themselves be referenced by other database records corresponding to research authors.

To generate the more comprehensive set of information corresponding to the target content object, a neighborhood graph may be created for the container of the target content object. The neighborhood graph may be created by locating a first referencing container that includes a reference to the container of the target content object and, then, including the first referencing container in the neighborhood graph. Further, the process may be performed recursively to a desired depth of recursion. For example, a second referencing container may include a reference to the first referencing container and therefore the second referencing container may also be included in the neighborhood graph.

As references are recursively traversed from target content object container at the center of the graph, the information included in containers located several reference links away from the container of the target content object may be considered to be less relevant for the purposes of the search. For example, the first referencing container above may be considered to be in a first graph layer and the second referencing container above may be considered to be in a second graph layer.

However, the further a container may be from the center of the neighborhood graph, for example, the second and third graph layers of the neighborhood graph, the less relevant the information included in the container may be. Such less relevant information may be described as "noise" within the set of text terms associated with the target content object.

Block 530 may refer to an operation in which the neighborhood graph may be refined to remove such "noise". Refining may be a process in which the similarity of each container in the neighborhood graph may be compared to the container of the target content object using information in the content object knowledge index. That is, the text terms of the container of the target content object may be scored using the values from the term/container co-occurrence matrix of the corresponding layer in the content object knowledge index. Then, the text terms of each of the containers in each graph layer of the neighborhood graph may also be scored using the values from the term/container co-occurrence matrix of the same layer in the content object knowledge index.

Similar scores may indicate a high level of similarity, and may also indicate a low level of "noise," and therefore a less "noisy" container may be kept in the neighborhood graph. Dissimilar scores may indicate a low level of similarity, and may also indicate a high level of "noise," and therefore a more "noisy" container may be removed from the neighborhood graph. The result of such a refining process may be a neighborhood graph including containers which are similar to the container of the target content object.

Block 540 may represent an operation to generate a description vector for the target content object. Such a description vector may be created by integrating the text terms included in each of the containers included in the neighborhood graph of the target content object. The description vector may be a value that represents the score of the text terms of each container of the neighborhood graph as determined by searching for the text terms in the web object knowledge indexing and assigning a score corresponding to the text terms from the web object knowledge index. Further, the scores of the integrated text terms may be weighted according to the graph layer n the neighborhood graph in which the text terms may have been located. For example, the description vector may be created by performing the following function:

$$C = \sum_{D_i \in G} w_i D_i$$

where G may represent the refined neighborhood graph, $D_i$ may represent a container in the refined neighborhood graph G, and $w_i$ may represent the weighting of the container. Further, the weighting $w_i$ may be created by performing the following function:

$$w_i \alpha \frac{1}{\log(d_i + 2)}$$

where $d_i$ may represent the graph layer of the container within the neighborhood graph, and the coefficient "2" may be added to avoid a zero in the denominator.

FIG. 6 shows further details of an example operation 420 as performed as part of the processing flow 400 (see FIG. 4) in accordance with an example implementation of content object indexing 120 (see FIG. 1). The processing flow of example operation 420 may be described with reference to the features of the execution environment 200 (see FIG. 2) and the example layer structure 300 (see FIG. 3), although such implementations are illustrative of examples only, and are not intended to be limiting in any manner.

Block 610 may refer to an operation in which a search for candidate matching content objects and/or content object containers in the content object knowledge index 240 is performed. Such candidate content objects and/or content object containers may be content objects and/or content object containers within the content object knowledge index with a score similar to the description vector created at block 540 (see FIG. 5). An exact match of the description vector may not be found in the content object knowledge index, and therefore, a set of one or more candidate content objects and/or content object containers may be identified within the content object knowledge index.

Block 620 may refer to an operation to discover the most similar candidate content object and/or content object container in the content object knowledge index. Such similarity may be determined by comparing the score of each candidate content object and/or content object container to the description vector of the target content object and/or content object container. The most similar candidate content object and/or content object container may be the candidate with the least difference in score, most difference in score, or any other predetermined measure to define similarity.

Finding the most similar candidate content object and/or content object container may also include recalculating the score of each candidate content object and/or content object container in the content object knowledge database. Such recalculation may be accomplished by including the score of related containers and/or content objects contained within the content object knowledge index. The related content objects and/or content object containers may be discovered in the content object knowledge database by inspecting the references or links corresponding to the candidate content objects and/or content object containers. Such an operation may be referred to as "confidence propagation".

For example, a container hierarchy may be constructed around each candidate content object. Content objects and/or containers including references to the candidate content object may be referred to as being "up" in the hierarchy relative to the candidate content object. Content objects and/or containers which may be referenced by the candidate content object may be referred to as being "down" in the hierarchy relative to the candidate content object. The scores of referenced content objects and/or containers may then be weighted and/or normalized to create a revised score or vector.

For example, the "confidence" of a target content object may be determined by performing the following functions:

$$D(r_i) = s(r_i) + \sum_{k \in par(r_i)} D(k), \ 1 \leq i < TL$$

$$U(r_i) = s(r_i) + \sum_{k \in chi(r_i)} \frac{U(k)}{NC(r_i)}, \ TL < i < L$$

$$S(r_{TL}) = s(r_{TL}) + \sum_{k \in par(r_{TL})} D(k) + \sum_{l \in chi(r_{TL})} \frac{U(l)}{NC(r_{TL})}$$

where s(.) may refer to the original score of a candidate content object; S(.) may represent the score of the candidate content object after "confidence propagation" has been performed; U(.) may refer to a score propagated from children located "down" the hierarchy; D(.) may refer to a score propagated from the parent located "up" the hierarchy, r may refer to a candidate content object and/or content object container and the subscript may refer to the layer where the candidate content object and/or content object container are located in the hierarchy; L may refer to the corresponding layer in the content object knowledge index; TL may represent the layer in the content object knowledge index which may correspond the layer where the candidate content object and/or content object container may be expected to be found; par(.) may represent the set of referenced content objects and/or content object containers located "up" the hierarchy; chi(.) may represent the set of referenced content objects and/or content object containers located "down" the hierarchy; and NC(.) may represent the number of children of the candidate content object and/or content object container. $S(r_{TL})$ may represent the similarity score, or a value which represents the similarity between the target content object and the candidate content object and/or content object container.

Block 630 may refer to an operation in which the candidate content object and/or content object container in the content object knowledge index with the highest score after the score has been recalculated may be chosen as a match for the target content object.

Block 640 may refer to an operation in which an index entry may be created and stored in the content object index 230. Each of the text terms corresponding to the matching content object in the content object knowledge index may be added to the index entry for the target content object in the content object index. The index entry for the target content object may also include a location of the target content object, information corresponding to related index entries, etc. Further, a reference to the target content object may be added to the selected candidate content object and/or content object container index entry within the content object knowledge database.

Indexing the target content object in this way may allow a user interface to display the indexes of the content object knowledge database and the corresponding references to located content objects.

Figure 7:
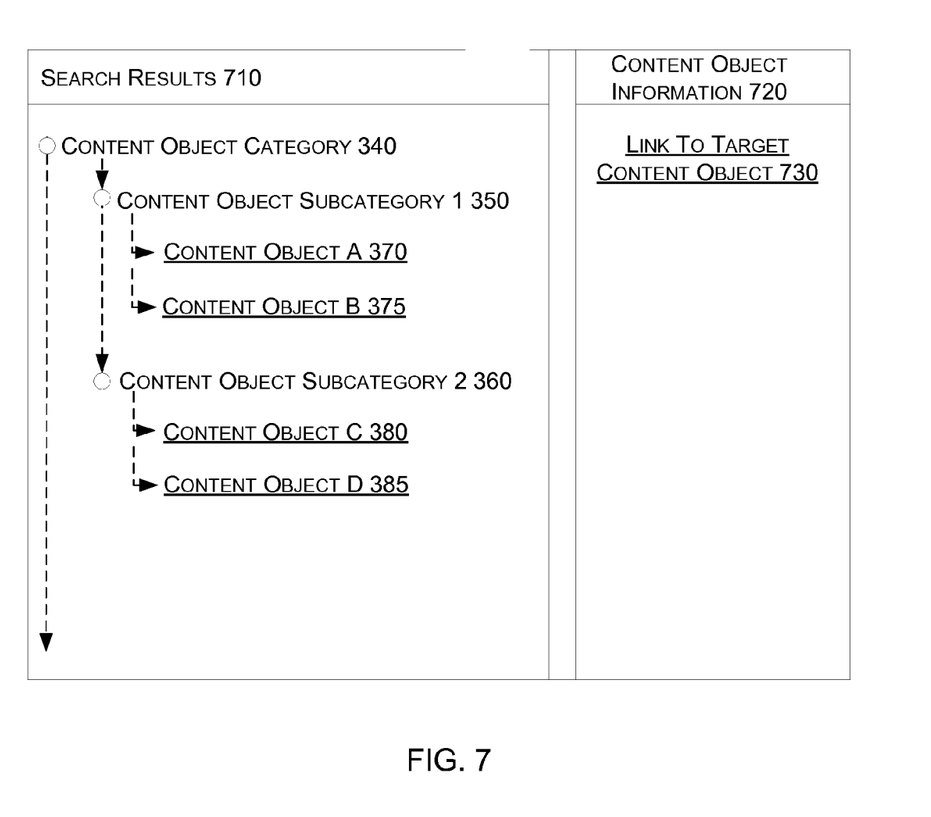
FIG. 7 is an example user interface which may be used in accordance with at least one implementation of a content object knowledge index.

FIG. 7 shows example user interface 700, which may be used to provide a user access to the indexes stored within a content object knowledge index. The example user interface 700 may be described with reference to the features of the execution environment 200 and the example layer structure 300 (see FIG. 3), although such implementations are illustrative of examples only, and are not intended to be limiting in any manner.

The example user interface 700 may display the indexes of the content object knowledge index 240 (see FIG. 2) either alone or in conjunction with the content object index 230 (see FIG. 2). For example, a user may navigate to a world wide web search site and be presented with the example user interface 700. Further, a user may use such example user interface 700 to navigate previously indexed music files or academic research materials.

That is, the content object knowledge index may include information structured in a manner similar to the example layer structure. Such an example layer structure may be represented in the user interface in the search results window 710. A world wide web page which references the example user interface 700 may require the user to choose a content object category 340, for example music or academic research. Upon arriving at a world wide web page including the example user interface 700, the search results window 710 may present a tree structure or tree control representing the indexes contained in the content object knowledge index corresponding to the chosen content object category 340.

Having identified a content object in the content object category 340 the user may be interested in, the user may select a content object subcategory, for example, content object subcategory 1 350 and/or content object subcategory 2 360. In one example, the content object represented by the content object category 340 may be a musical artist, the content object subcategory 1 350 may be a first album and the content object subcategory 2 360 may be a second album. In an alternative example, the content object represented by the content object category 340 may be a researcher, the content object subcategory 1 340 may be a first academic publication and the content object subcategory 2 350 may be a second academic publication.

Having identified a content object subcategory the user may be interested in, the user may select a content object and/or a content object container, for example, content object A 370, content object B 375, content object C 380, content object D 385. Information corresponding to the content object and/or the content object itself may be presented in the content object information window 720 in response to the user selecting a content object reference in the search results window 710.

The content object information window 710 may then present information related to the selected content object and may include one or more references referencing where the content object and/or copies of the content object may be located. For example, the type of content object may be a music file and the content object information window 710 may include information corresponding to the music file and/or links to the location of the music file. In an alternative example, the type of content object may be a research paper and the content object information window 710 may include information corresponding to the research paper and/or links to the location of the research paper.

It is to be understood that the computer environment for any of the examples and implementations described above may include a computing device having, for example, one or more processors or processing units, a system memory, and a system bus to couple various system modules.

The computing device may include a variety of computer readable media (e.g., computer readable storage mediums), including both volatile and non-volatile media removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A computer-implemented method, comprising:
   creating, by using a computer, at least one content object knowledge index, wherein the at least one content object knowledge index stores information corresponding to one or more content objects in multiple hierarchical layers;

generating a description vector of a target content object, wherein the generating comprises:

constructing a neighborhood graph for a container of the target content object, wherein the neighborhood graph includes other containers comprising at least one of: a direct reference to the target content object or an indirect reference to the container of the target content object;

based on a level of relevance between individual other containers and the container of the target content object, refining the neighborhood graph using the at least one content object knowledge index to provide a refined neighborhood graph comprising one or more relevant other containers, wherein the refining comprises determining a similarity between the container of the target content object and a neighbor container wherein the determining comprises:

finding a first description vector of the container of the target content object in the at least one content object knowledge index and calculating a first score associated with the first description vector; and creating the description vector by integrating one or more text terms included in the one or more relevant other containers, wherein at least one of the one or more text terms is associated with an associated weight applied using a frequency inverse document frequency function;

indexing the target content object in a content object index using the description vector in conjunction with the at least one content object knowledge index, wherein the at least one content object knowledge index and the content object index are stored in at least one memory, and wherein the indexing comprises:

identifying a set of candidates in the at least one content object knowledge index by selecting individual content objects or individual content object containers that have a corresponding score similar to the description vector;

for each candidate of the candidates, calculating a revised score based on each candidate's corresponding score and at least one other score of a neighbor of each candidate; and based on the revised scores for the candidates, choosing a similar candidate from the set of candidates that is similar to the description vector of the target content object;

creating an index entry of the content object index for the target content object, wherein the index entry includes one or more individual corresponding text terms and hierarchy information of a corresponding index entry of the at least one content object knowledge index corresponding to the similar candidate, wherein the hierarchy information is associated with a specific layer of the multiple hierarchical layers of information stored in the at least one content object knowledge index; and adding a reference to the target content object to the index entry of the at least one content object knowledge index.

2. The method of claim 1, wherein creating the at least one content object knowledge index includes creating multiple content object knowledge indexes using a structure related to a category of content objects.

3. The method of claim 1, wherein creating the at least one content object knowledge index includes applying semantic indexing to a collection of content object containers.

4. The method of claim 1, wherein the determining further comprises:

finding a second description vector of the neighbor container in the at least one content object knowledge index and calculating a second score associated with the second description vector, comparing the first and second scores; and discarding the neighbor container when the similarity between the first and second scores is smaller than a predetermined value.

5. A system comprising:

at least one processor; and at least one memory;

an indexing service implemented by the at least one processor and the least one memory, wherein the indexing service configured to:

create at least one content object knowledge index, wherein the at least one content object knowledge index stores information corresponding to one or more content objects in multiple hierarchical layers;

generate a description vector of a target content object, wherein to generate comprises:

constructing a neighborhood graph for a container of the target content object, wherein the neighborhood graph includes other containers comprising at least one of: a direct reference to the target content object or an indirect reference to the container of the target content object;

based on a level of relevance between individual other containers and the container of the target content object, refining the neighborhood graph using the at least one content object knowledge index to provide a refined neighborhood graph comprising one or more relevant other containers, wherein the refining comprises determining a similarity between the container of the target content object and a neighbor container, wherein the determining comprises:

finding a first description vector of the container of the target content object in the at least one content object knowledge index and calculating a first score associated with the first description vector; and creating the description vector by integrating one or more text terms included in the one or more relevant other containers, wherein at least one of the one or more text terms is associated with an associated weight applied using a frequency inverse document frequency function;

index the target content object in a content object index using the description vector in conjunction with the at least one content object knowledge index, wherein to index comprises:

identifying a set of candidates in the at least one content object knowledge index by selecting individual content objects or individual content object containers that have a corresponding score similar to the description vector;

for each candidate of the candidates, calculating a revised score based on each candidate's corresponding score and at least one other score of a neighbor of each candidate; and based on the revised scores for the candidates, choosing a similar candidate from the set of candidates that is similar to the description vector of the target content object;

create an index entry of the content object index for the target content object, wherein the index entry includes one or more individual corresponding text terms and hierarchy information of a corresponding index entry of the at least one content object knowledge index corresponding to the similar candidate, wherein the hierarchy information is associated with a specific layer of the multiple hierarchical layers of information stored in the at least one content object knowledge index; and add a reference to the target content object to the index entry of the at least one content object knowledge index.

6. The system of claim 5, wherein to create at least one content object knowledge index comprises creating multiple content object knowledge indexes using a structure related to a category of content objects.

7. The system of claim 5, wherein the determining further comprises:
finding a second description vector of the neighbor container in the at least one content object knowledge index and calculating a second score associated with the second description vector,
comparing the first and second scores; and
discarding the neighbor container when the similarity between the first and second scores is smaller than a predetermined value.

8. At least one computer-readable storage medium having one or more executable instructions that, when read, cause one or more processors to:
create at least one content object knowledge index, wherein the at least one content object knowledge index stores information corresponding to one or more content objects in multiple hierarchical layers;
generate a description vector of a target content object, wherein to generate comprises:
constructing a neighborhood graph for a container of the target content object, wherein the neighborhood graph includes other containers comprising at least one of: a direct reference to the target content object or an indirect reference to the container of the target content object;
based on a level of relevance between individual other containers and the container of the target content object, refining the neighborhood graph using the at least one content object knowledge index to provide a refined neighborhood graph comprising one or more relevant other containers, wherein the refining comprises determining a similarity between the container of the target content object and a neighbor container, wherein the determining comprises:
finding a first description vector of the container of the target content object in the at least one content object knowledge index and calculating a first score associated with the first description vector; and
creating the description vector by integrating one or more text terms included in the one or more relevant other containers, wherein at least one of the one or more text terms is associated with an associated weight applied using a frequency inverse document frequency function;
index the target content object in a content object index using the description vector in conjunction with the at least one content object knowledge index, wherein to index comprises:
identifying a set of candidates in the at least one content object knowledge index by selecting individual content objects or individual content object containers that have a corresponding score similar to the description vector;
for each candidate of the candidates, calculating a revised score based on each candidate's corresponding score and at least one other score of a neighbor of each candidate; and
based on the revised scores for the candidates, choosing a similar candidate from the set of candidates that is similar to the description vector of the target content object;
create an index entry of the content object index for the target content object, wherein the index entry includes one or more individual corresponding text terms and hierarchy information of a corresponding index entry of the at least one content object knowledge index corresponding to the similar candidate, wherein the hierarchy information is associated with a specific layer of the multiple hierarchical layers of information stored in the at least one content object knowledge index; and
add a reference to the target content object to the index entry of the at least one content object knowledge index.

9. The at least one computer-readable medium of claim 8, wherein to create at least one content object knowledge index comprises creating multiple content object knowledge indexes using a structure related to a category of content objects.

10. The at least one computer-readable medium of claim 8, wherein the determining further comprises:
finding a second description vector of the neighbor container in the at least one content object knowledge index and calculating a second score associated with the second description vector,
comparing the first and second scores; and
discarding the neighbor container when the similarity between the first and second scores is smaller than a predetermined value.

* * * * *